March 23, 1943. W. J. VAN ROSSEM 2,314,377
MOLDING FLASK
Filed March 15, 1940
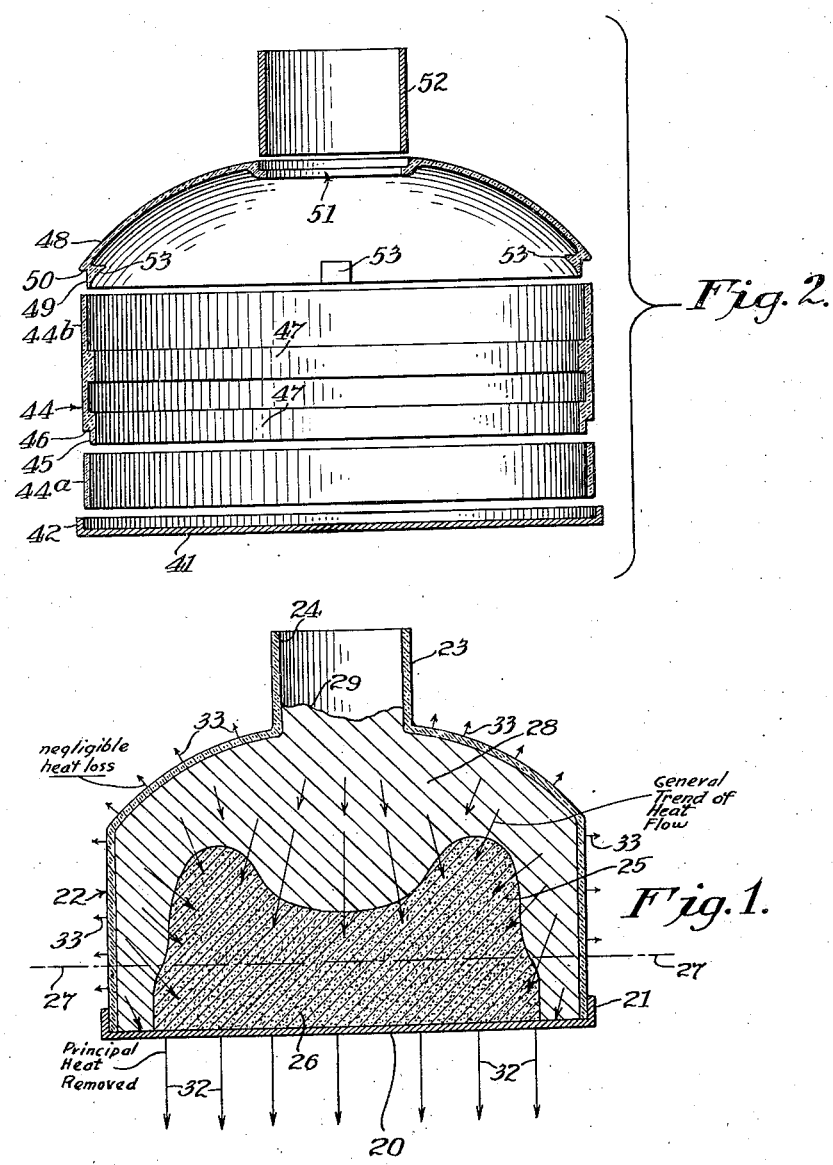
Walter J. van Rossem,
INVENTOR.
BY
ATTORNEY.

Patented Mar. 23, 1943

2,314,377

UNITED STATES PATENT OFFICE 2,314,377

MOLDING FLASK

Walter J. van Rossem, Los Angeles, Calif., assignor to Surgident, Ltd., Los Angeles, Calif., a corporation of California Application March 15, 1940, Serial No. 324,109

5 Claims. (Cl. 18—33)

This invention relates to molding methods and flasks and pertains more particularly to molding methods and flasks for preparing highly accurate molds of thermoplastic hydrocolloid materials or the like, from patterns such as those comprising dental castings or models of stone, plaster of Paris, or the like.

Thermoplastic molding compositions, particularly those employed in dental practice, are quite resilient, and are thus subject to resilient deformation under comparatively small stresses. It has hitherto been the general practice, in casting a mold of thermoplastic material from a plaster or stone pattern, to place the pattern on a base plate of metal, surround the casting with a metal "flask," and pour the heated (fluent) thermoplastic material into the flask to surround the portions of the pattern from which the mold is to be made. As the fluent material in its sol condition cools to its point of solidification shrinkage takes place. This shrinkage corresponds generally to the thermal contraction of the solvent liquid, water in the reversible hydrocolloids, some other solvent in reversible non-aqueous colloids. After solidification takes place, i. e., when the material is in the gel condition, the shrinkage on further cooling is negligible.

In the above illustration of general practice, the entire flask is usually cooled by partly or completely immersing the same in cool water, which causes a general withdrawal of heat from the thermoplastic mass from the center of such mass outwardly in all directions, which naturally results in the solidification of the central portion of the mass after the marginal portions have solidified. This means that the central portions of the mass will continue to contract (by cooling) after the marginal portions have solidified, causing stresses to be set up in such central portions. These stresses are usually of sufficient magnitude to cause the marginal portions to be resiliently drawn inwardly toward the center, and after the entire body of thermoplastic has cooled it is noted that in some portions the mold has been pulled away from the pattern, resulting in an inaccurate mold.

The pattern or model is customarily saturated with hot water before the thermoplastic material is poured around it. This serves two purposes, first it displaces air in the pores of the model so that no air is released by the model when contacted with the thermoplastic material to form bubbles in the mold adjacent the model, and second, it prevents an immediate chilling of the thermoplastic into solidified condition upon contact with the pattern so that a faithful reproduction of the surface detail may be obtained. In view of the relatively large bulk of the pattern as compared with the volume of surrounding thermoplastic, the above-mentioned tendency for the marginal portions of the thermoplastic body to solidify prior to the central portions will be experienced even though the flask is merely allowed to cool in the air (instead of immersing the same in cool water).

It is a particular and important object of this invention to produce perfect molds by controlling the temperature gradient through the mold in such manner that the thermoplastic molding material located adjacent the pattern is cooled more rapidly than that located at positions removed from the pattern.

Another object of the invention is to provide a method of producing molds from thermoplastic hydrocolloid materials or the like in which the heat flow from the hydrocolloid material is controlled in such manner that the material adjacent the bottom of the flask and adjacent the pattern is chilled most rapidly, to produce a progressive outward solidification of such material, wherein the resulting stresses due to the contraction upon cooling are utilized to pull the molding material into close engagement with the pattern.

A further object of the invention is to provide a molding flask having its walls constructed and arranged in such manner that the temperature gradients through the molding material are such as to cause the molding material to cool adjacent the pattern and bottom of the flask more rapidly than it cools at other positions in the flask.

According to the method of the present invention, the casting operation is carried out in such manner as to obtain a progressive solidification of the thermoplastic molding composition outwardly from the surface of the pattern of which a reproduction is desired, by withdrawing the principal proportion of the contained heat from the composition through the pattern itself, all as is more particularly described hereinbelow.

The present disclosure also pertains to an advantageous form of molding flask with which the method of the present invention may be practiced. In its broadest preferred aspects a molding flask of my invention comprises a base member of high thermal conductivity adapted to support the pattern in contact therewith, and a cap member associated with the base member and extending above the pattern to form a cavity for the reception of the fluent thermoplastic material. The cap member comprises at least a portion adjacent the bottom thereof and extending therearound of lower thermal conductivity than the base member, which portion serves to thermally insulate the upper portion of the cap member from the base member. In one specific embodiment the cap member may be wholly fabricated from material of lower thermal conductivity than the base member.

Further objects and advantages of my invention will either be specifically brought out in the ensuing description or will be apparent therefrom.

The accompanying drawing illustrates typical embodiments of a flask of my invention and the practice of my method, and referring thereto:

Fig. 1 is a vertical section of a molding flask according to my invention, showing the mold as formed about a stone or plaster pattern, together with certain schematic representations illustrating the practice of the present method; and Fig. 2 is an exploded vertical section of a molding flask of the type used in the dental profession and embodying my invention.

Referring to Fig. 1, a flask embodying my invention is shown as comprising a base 20 fabricated from a material having a high thermal conductivity such as brass. The base may be constructed according to conventional lines in the form of a circular plate provided with an upturned edge 21 adapted to receive a cap member 22 which in this case is shown as a unitary member and includes both side wall means and the top cover means along with an upper reduced neck portion 23 provided with an opening 24 through which the thermoplastic material in its heated fluent state is introduced into the flask. By following the teaching of my invention the member 22 in all its parts may be produced from a single casting of plastic material such as "Bakelite," and the thermal conductivity thereof is considerably less than the thermal conductivity of the base plate 20.

In preparing a mold with the apparatus illustrated in Fig. 1, for example, a stone or plaster of Paris pattern 25 is placed on the base 20 and located generally centrally thereof and in contact therewith. The pattern 25 usually comprises a stone or plaster of Paris cast of a full or partial upper or lower denture and usually has a surface which is somewhat greater than the surface which is to be produced. That is, the pattern is usually provided with a base portion 26 which extends below the level of the actual surface to be reproduced. The base portion is usually flat on its lower side so that it will rest firmly on the base member 20 and will provide a large contact area for heat flow. For example, the surface portion of the pattern to be reproduced may be located above line 27—27, and the base portion may be located below the line 27—27.

After the pattern has been placed in position, the combined wall and cover member 22 is slipped into place above the plate 20 and in engagement with the edge 21. A heated molding material, such as for example a thermoplastic hydrocolloid material of a type disclosed in Harrison Patent No. 2,021,059, in a sol condition, is introduced through the opening 24, this material being indicated by the widely spaced section lines at 28, and the flask is filled to any convenient level, as to the level indicated at 29. The pattern is usually saturated with hot water for some time before it is placed on the plate 20 so that the material does not immediately solidify upon contacting the pattern, for reasons previously mentioned.

The flask is next cooled to cause the thermoplastic material to gel or set. This cooling may be accomplished in a variety of manners, for example the flask may be set with its base plate 20 on a cake of ice or on a refrigerated plate or may be partially immersed in cold water. Whichever one of the cooling procedures is resorted to, due to the construction of the flask the greatest tendency for heat flow outwardly of the material is through the bottom plate 20. There is little tendency for the heat to flow through the surface 29 or through the walls of the cover 22.

Since the mold is cooled by extracting heat through the highly conductive base member 20 while surrounding the remaining portion of the mold with the cap 22 of insulating material, the principal portion of the heat removed from the material is removed through the bottom, as indicated by the arrows 32. The principal proportion of the heat contained in the material then flows inwardly toward and through the pattern and the base member 20, as indicated by the flow arrows in the material, and a negligible portion of the heat in the material flows outwardly through the cap member in the direction indicated by the arrows 33. By maintaining the outward flow of heat through the plate 20 sufficiently greater than the outward flow of heat through the cap 22, as by maintaining a relatively high temperature difference between these two members, all portions of the material may be maintained at a temperature not less than the solidification temperature of the material until adjacent portions of the material inwardly removed toward the pattern have reached the solidification temperature. For that reason the material will solidify first about the pattern and then progressively outwardly from the pattern.

Since the material solidifies first about the surface of the pattern to be reproduced and then progressively outwardly and because it shrinks upon cooling until reaching the gel condition or phase as pointed out above, it will set in tight engagement with the pattern and will be stressed toward the pattern. If the pattern is removed from the mold immediately after the mold solidifies, these stresses will be relieved by a generally inward movement of the mold and the resultant mold will be warped in relation to the pattern. In order to overcome this difficulty, the mold is allowed to stand for a time after it is known to have solidified before the pattern is removed. During this period the stresses in the mold are relieved by the plastic flow of the material in the mold, which is an inherent characteristic of the thermoplastic material, and the material takes a permanent set in close engagement with the pattern so that the resultant mold is a highly accurate reproduction of the pattern.

With prior flasks and procedures, as may be envisioned by considering both the base 20 and the cap member 22 fabricated from brass, the outward flow of heat from the material through the cap 22 was on the order of the flow of heat outwardly through the base member 20. For that reason the solidification of the molding material was generally progressively inwardly from the walls of the flask, and the last portion of the mold to solidify was usually located in the interior of the mold at a position removed from the flask and the pattern, as for example the material within the dotted area 30. As the material in the area 30 cooled to solidification, the accompanying shrinkage would tend to pull the mold away from the upper portions of the pattern to a position indicated by the dotted line 34, for example, with the result that the mold was imperfect.

It has been the custom to pour the thermoplastic material at a temperature as near as possible to the solidification temperature in order to minimize the errors resulting from shrinkage. However, this results in voids adjacent difficultly reproducible portions of the pattern since the material gels before entering these portions of the pattern. With my invention perfect reproductions may be had with the material poured at any reasonable temperature above solidification temperature, whereby the material remains in sol state for a sufficient time to contact all portions of the pattern.

Referring now to Fig. 2, the flask is shown as comprising a base member 41 usually of circular shape and provided with an upturned edge 42 adapted to receive a cap member comprising side-wall means 44 made up from a plurality of rings 44a and 44b. According to conventional constructions, the lower ring 44a is usually from one-quarter each to one and one-half inches in height and nests snugly against the base 1 and within the upturned edge 42. This ring is usually provided with a smooth inner surface.

It is general practice to provide each flask with a plurality of rings of various heights in the range between the above-mentioned heights. The side wall usually consists of one of these rings 44a and one ring 44b. The height of the pattern governs the height of the ring 44a chosen. The upper ring 44b is usually provided with a downwardly extending lip 45 of reduced diameter which fits snugly within the ring 44a, and with a shoulder 46, which rests on the top of the ring 44a. The upper ring 44b is usually provided with inwardly projecting lands or rings 47, so that the solidified casting will adhere to these rings and the rings may be used as protection for the casting when the bottom and the ring 44a are removed from the structure.

The cap member further comprises a top member 48 having a downwardly projecting lip 49 which is adapted to closely engage the inside of ring 44b and a shoulder 50 which is adapted to rest on this ring. The top member is usually provided with an opening 51 in the upper part thereof, through which the molding material may be poured in a heated fluent state. In order to increase the hydrostatic head on the material within the mold without the undue use of molding material, when such increase in head is desirable, an upstanding cylindrical member 52 of small diameter may be removably fitted in the opening 51, and the molding material may be poured to a position adjacent the top of the member 52. The tops of such flasks are usually provided with suitable means for engaging the thermoplastic after it is poured and gelled, either by means of a ring, land, or spaced projections such as shown at 53.

A flask such as described in connection with Fig. 2 is usually constructed entirely from material of high thermal conductivity such as brass. To construct the above flask in accordance with one example of my invention, the base 41 may be fabricated from material having a high thermal conductivity such as brass, as usually employed, and the cap member comprising the rings 44a and 44b and the top 48 are fabricated from a material having a low thermal conductivity such as a molded plastic material or molded rubber.

It is within the contemplation of my invention, however, to fabricate the first ring 44a from brass or some other material having a high thermal conductivity. This will be satisfactory since the first ring usually comprises only a small portion of the total area of the wall means and is usually located below the portion of the pattern about which an accurate mold is to be obtained. For this reason, when the lower ring 44a is fabricated from some material of low thermal conductivity such as "Bakelite," it is within the contemplation of this invention to provide the lower portion of this ring with a metal reinforcement to decrease the tendency for breakage by chipping, etc. For practical purposes it is also desirable to fabricate the top member 48 from a material having a low thermal conductivity such as "Bakelite."

It should now be obvious that the cover member may be omitted as long as the remainder of the flask is so constructed and cooled as to cause the extraction of the major portion of the heat from the molding material in a direction downwardly toward the pattern and conductive base member, and the rate of cooling is such as to produce the progressive solidification of the molding material outwardly from the pattern while maintaining the temperature of adjacent outer portions of the molding material not below solidification temperature. In this connection, it is possible to fabricate the ring 44b and cover 48 from material of high conductivity and to fabricate the ring 44a from material of low conductivity as long as the above conditions are realized. It is also possible to fabricate the members 44a, 44b and 48 from material of high thermal conductivity and provide means for insulating them from the base 41 such as a gasket or rubber or the like between the ring 44a and the base 41. This will be satisfactory as long as the difference in temperature between the side walls and the base can be maintained sufficiently great. In all of the above examples the wall means comprises at least a portion of lower thermal conductivity than the base member, located adjacent the bottom of the wall means and extending therearound, which serves to thermally insulate the wall means and preferably the major portion thereof from the base member.

As another example of a construction which is useful in accordance with my invention, I may fabricate the wall means from a material of high thermal conductivity and provide it with thermally insulating lining such as an anodic coating of rubber. With such or comparable constructions, the insulating lining is to be considered as the wall means of the flask, and the metal may be considered as a support or a protection for the coating.

It is also to be understood that the wall and cover portions of the flask need not be fabricated from rigid materials, but that flexible or semi-rigid materials may be used. For example, they may be fabricated from rubber or from fabric impregnated with or embedded in rubber.

Obviously, my invention is subject to considerable modification, and for that reason I do not wish to be limited to the examples described herein, but rather to the scope of the subjoined claims.

I claim:

1. A flask for casting a mold of solidified thermoplastic material about a pattern, comprising: a base of high heat conductivity adapted to receive the pattern in heat-receiving relation thereto; and an upper portion of low heat conductivity.

2. A flask for casting a mold of solidified thermoplastic material about a pattern, comprising: a base of high heat conductivity adapted to receive the pattern in heat-receiving relation thereto; and side wall portions adjacent the base of low heat conductivity.

3. A flask for casting a mold of solidified thermoplastic material about a pattern, comprising: a base of high heat conductivity adapted to receive the pattern in heat-receiving relation thereto; and means insulating the walls and cap above the base against heat dissipation.

4. A flask for casting a mold of solidified thermoplastic material about a pattern, comprising: a base of high heat conductivity adapted to receive the pattern in heat-receiving relation thereto; side walls of low heat conducivity; and a cap.

5. A flask for casting a mold of solidified thermoplastic material about a pattern, comprising: a base of high heat conductivity adapted to receive the pattern in heat-receiving relation thereto; and side walls and a cover of low heat conductivity.

WALTER J. van ROSSEM.